(12) United States Patent
Shin

(10) Patent No.: US 7,489,647 B2
(45) Date of Patent: Feb. 10, 2009

(54) METHOD FOR PERFORMING CELL BROADCASTING AND COMMUNICATION SYSTEM USING THE SAME

(75) Inventor: Sang Rim Shin, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 1255 days.

(21) Appl. No.: 10/648,398

(22) Filed: Aug. 27, 2003

(65) Prior Publication Data

US 2004/0038691 A1    Feb. 26, 2004

Related U.S. Application Data

(63) Continuation of application No. 09/576,052, filed on May 23, 2000, now Pat. No. 6,738,634.

(30) Foreign Application Priority Data

Jul. 31, 1999    (KR) .............................. 1999-31610

(51) Int. Cl.
*H04Q 7/20*    (2006.01)
(52) U.S. Cl. .................... 370/310; 370/328; 370/329; 370/338; 455/466
(58) Field of Classification Search ............. 370/310, 370/310.1, 312, 314, 321, 328, 329, 337, 370/338, 342, 347, 349, 352; 455/450, 451, 455/452.2, 552.1, 466
See application file for complete search history.

(56) References Cited

U.S. PATENT DOCUMENTS

| 5,878,033 A | | 3/1999 | Mouly ......................... 370/312 |
| 6,144,653 A | * | 11/2000 | Persson et al. ............... 370/337 |
| 6,219,557 B1 | | 4/2001 | Havinis ....................... 455/456 |
| 6,263,212 B1 | | 7/2001 | Ross et al. ................... 455/466 |
| 6,385,451 B1 | | 5/2002 | Kalliokulju et al. ......... 455/437 |

(Continued)

*Primary Examiner*—Jean A Gelin
(74) *Attorney, Agent, or Firm*—KED & Associates, LLP

(57) ABSTRACT

A method for performing cell broadcasting and a communication system using the same are provided. The method includes steps of receiving in a mobile station at least one data unit of a short message service cell broadcasting (SMSCB) message broadcast from at least one cell of a communication system; and reading the SMSCB message based on the schedule message, wherein the schedule message is comprised of a plurality of fields for informing the mobile station of a location of the SMSCB message, a length of a schedule period, and whether a new SMSCB message has been broadcast. The schedule message also includes a field for informing the mobile station of a location of a next schedule message, a field for informing the mobile station of at least one of a start frame and an end frame of the schedule period, and a media access control (MAC) header made up of first and second fields, the first field indicating whether the at least one data unit is to be mapped to one of a common logical channel of the MAC layer or a dedicated logical channel of the MAC layer and the second field indicating whether the at least one data unit is to be mapped to one of a common control channel of the MAC layer or a common traffic channel of the MAC layer. The communication system realizes the SMS cell broadcasting through a UTRAN-MAC-c entity for performing steps of scheduling, multiplexing, and transmitting, and a UE-MAC-c entity for performing steps of receiving, demultiplexing, and reading.

37 Claims, 8 Drawing Sheets

U.S. PATENT DOCUMENTS

| | | | |
|---|---|---|---|
| 6,400,942 B1 * | 6/2002 | Hansson et al. | 455/426.1 |
| 6,434,133 B1 | 8/2002 | Hamalainen | 370/338 |
| 6,473,622 B1 | 10/2002 | Meuronen | 455/466 |
| 6,522,877 B1 * | 2/2003 | Lietsalmi et al. | 455/422.1 |
| 6,577,871 B1 * | 6/2003 | Budka et al. | 455/453 |
| 6,697,352 B1 * | 2/2004 | Ludwig et al. | 370/349 |

* cited by examiner

METHOD FOR PERFORMING CELL BROADCASTING AND COMMUNICATION SYSTEM USING THE SAME

This application is a continuation of U.S. patent application Ser. No. 09/576,052 filed on May 23, 2000 now U.S. Pat. No. 6,738,634, which claims priority to Korean Patent Application No. 31610/1999 filed Jul. 31, 1999, which is hereby incorporated by reference.

BACKGROUND OF THE INVENTION

1. Field of the Invention

The present invention relates to cell broadcasting in a communication system, and more particularly, to a method for the cell broadcasting of short messages in a 3GPP communication system, in which a new schedule message scheme is adopted.

2. Discussion of the Related Art

Short message service (SMS) is a service provided by a network for the transmission of alphanumeric messages to a mobile station, i.e., a user equipment (UE), which may "receive" a short message even in an idle state. The short message may be initiated by a cellular telephone, an information service, or the network itself and may include such information as that for email notification, voicemail notification, cellular messaging teleservice, or cellular paging teleservice.

Standards for SMS technology include IS-637 for a CDMA environment and IS-95 and J-STD-008 for a radio environment. In the CDMA environment, a service center provides short messages, which are received by a base station from a core network and are transmitted from the base station to a mobile station through a control channel, i.e., a paging channel. In the radio environment, a global system for mobile communications, known as the GSM system, supports a cell broadcasting of short messages, whereby SMS cell broadcasting (SMSCB) messages are broadcast over at least one cell from a public land mobile network to one or more mobile stations.

Referring to FIG. 1, a 3GPP communication system consists of a UE system, a network (UTRAN) system, and a core system (not shown). The UE and UTRAN systems utilize bidirectional channels, i.e., an uplink and a downlink, and each system includes a higher layer, a radio resource control (RRC) layer corresponding to layer 3, a radio link control (RLC) layer and a media access control (MAC) layer corresponding to layer 2, and a physical (PHY) layer corresponding to layer 1.

The physical layer provides a plurality of transmission channel types to the MAC layer, which in turn provides a plurality of logical channel types to the RLC layer. The transmission channels are either common channels or dedicated channels depending on the mode of transmission on a radio link, and the logical channels are either control channels or traffic channels depending on whether the data transmission service provided by the MAC layer to the RLC layer is transmitting control data or user data. In addition, the physical layer performs the encoding/decoding and multiplexing/demultiplexing of transmission channels and the modulation/demodulation and spreading/despreading of physical channels, performs chip, bit, slot & frame synchronization, controls transmit power and transmission rate, and performs frequency processing and error detection and correction.

The RLC layer receives from the higher layer a message corresponding to a service selected by a user, and the RRC layer controls a logical connection of the lower layers, i.e., the RLC, MAC, and physical layers, which provide the services selected at the higher layer. To this end, the RRC layer is respectively connected to each of the lower layers by a service access point (not shown in FIG. 1) through which primitives are transmitted and received for controlling the RRC layer. The RRC layer thus confirms, maintains, and releases the logical connections and assigns, reconstructs, and releases radio resources for each connection.

Upon receiving a service message from the higher layer, the RLC layer controls the radio link with a corresponding system, i.e., the UE or UTRAN system. In doing so, the RLC layer divides (segments) and reconstructs the received service message, compresses the RLC header, and performs concatenation, padding, error correction, flow control, and transmission of capsulated data units, i.e., one or more frames. The MAC layer receives the capsulated data units from the RLC layer and, based on the compressed header, constructs MAC data units.

FIGS. 2 and 3 respectively show message schemes according to GSM standards, each for the cell broadcasting of the short messages, where an SMSCB message is diagrammed in FIG. 2 and a schedule message is diagrammed in FIG. 3. The SMSCB message is comprised of 88 octets, each field of the message being comprised of one or more octets, to include the message content preceded by a serial number field, a message identifier field, a data coding scheme field, and a page parameter field designating a total number of pages. The schedule message is similarly comprised of octets and includes fields for type, start slot number, end slot number, new SMSCB message bitmap, new SMSCB message description, other message descriptions.

Cell broadcasting of an SMS message as above is performed in the GSM system according to one of two modes, i.e., a discontinuous reception (DRX) mode or a non-discontinuous reception (non-DRX) mode, according to the type of short message being transmitted from the higher layer. In the DRX mode, the UE uses the schedule message to read the SMSCB message, but only when a desired SMSCB message is renewed, and ignores all other message data. In the non-DRX mode, the UE reads all frames, i.e., all data units transmitted on the radio link, to read any desired SMSCB message without the information of a schedule message, by classifying each SMSCB message as desired or undesired based on their respective headers.

The SMSCB message and schedule message as above are adapted to the GSM system, where no message may exceed 88 octets, where the length of a SMSCB message may not exceed fifteen pages, and where each message must be accompanied by a header for each page. Further adaptation, however, is needed to apply the short message service of the CDMA environment or the SMS cell broadcasting of the GSM environment to a third-generation mobile communication (3GPP) system where macro message transmission is expected and where global roaming service is desired. Particularly, a suitable technical specification for SMS cell broadcasting is required for the 3GPP system, which is based on the core network of the GSM system and radio access technology.

SUMMARY OF THE INVENTION

Accordingly, the present invention is directed to a method for performing cell broadcasting, and to a communication system using the same, that substantially obviates one or more of the problems due to limitations and disadvantages of the related art.

An object of the present invention, which has been devised to solve the foregoing problems, lies in providing a method for performing cell broadcasting and a communication system using the same, by which short messages of unlimited length are broadcast in a 3GPP system.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method for performing cell broadcasting, comprising steps of receiving in a mobile station at least one data unit of a short message service cell broadcasting (SMSCB) message broadcast from at least one cell of a communication system; and reading the SMSCB message based on a schedule message comprised of a plurality of fields for informing the mobile station of a location of the SMSCB message, a length of a schedule period, and whether a new SMSCB message has been broadcast. The schedule message further comprises fields for informing the mobile station of a location of a next schedule message and for informing the mobile station of at least one of a start frame and an end frame of the schedule period, and a media access control (MAC) header comprising a first field and a second field. The first field of the MAC header indicates whether the at least one data unit is to be mapped to one of a common logical channel of the MAC layer or a dedicated logical channel of the MAC layer; and the second field of the MAC header indicates whether the at least one data unit is to be mapped to one of a common control channel of the MAC layer or a common traffic channel of the MAC layer.

In the present invention, cell broadcasting is achieved by transmitting and s receiving an SMSCB message. In the transmission stage, a UTRAN-MAC-c entity performs steps of scheduling the SMSCB message; multiplexing, at a lower layer in a communication system, a common traffic channel with a common control channel, a dedicated traffic channel, and a dedicated control channel, wherein the common traffic channel and the common control channel are common logical channels and the dedicated traffic channel and the dedicated control channel are dedicated logical channels; and transmitting a schedule message through the common traffic channel. In the reception stage, a UE-MAC-c entity performs steps of receiving the schedule message; demultiplexing, at a lower layer in the communication system, a common traffic channel with a common control channel, a dedicated traffic channel, and a dedicated control channel, wherein the common traffic channel and the common control channel are common logical channels and the dedicated traffic channel and the dedicated control channel are dedicated logical channels; and reading the SMSCB message based on the schedule message. The present invention also provides a system for performing cell broadcasting, comprising the above UTRAN-MAC-c and UE-MAC-c entities.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings.

Figure 1:
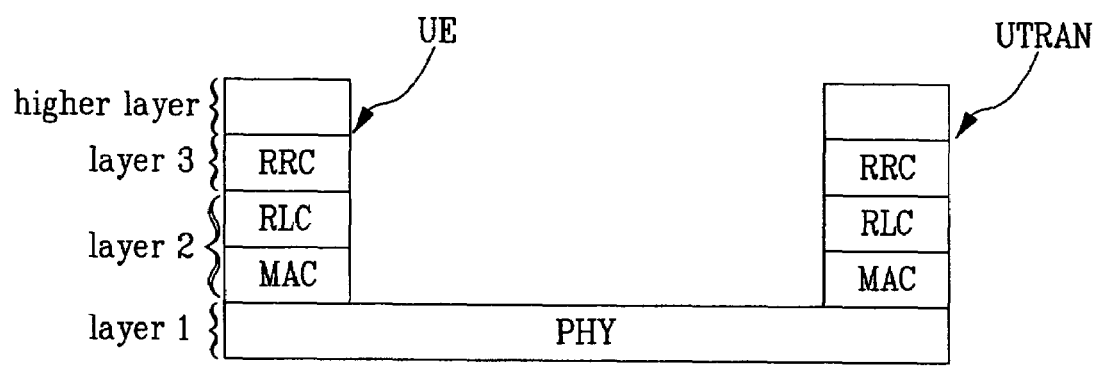
FIG. 1 is simplified block diagram of an air interface in a 3GPP system.

Each technical area of a third-generation mobile communication system or 3GPP system is described in a corresponding technical specification group, such as the first working group (WG1) or the second working group (WG2), each of which are directed to a radio access network. WG1 suggests a general technology for a physical layer or Layer 1, while WG2 defines a data link layer (layer 2 of FIG. 1) and a network layer (layer 3 of FIG. 1), which are higher than the physical layer, as second and third radio layers, respectively.

Figure 2:
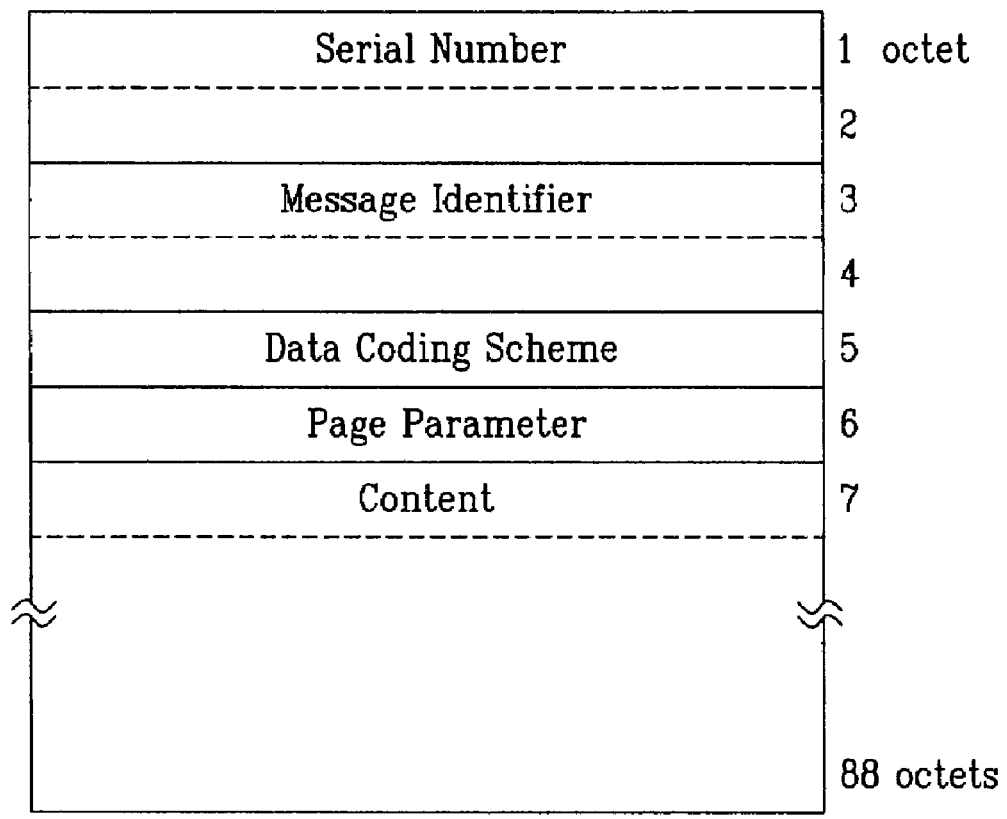
FIG. 2 is a diagram of an SMSCB message according to GSM standards.
Figure 3:
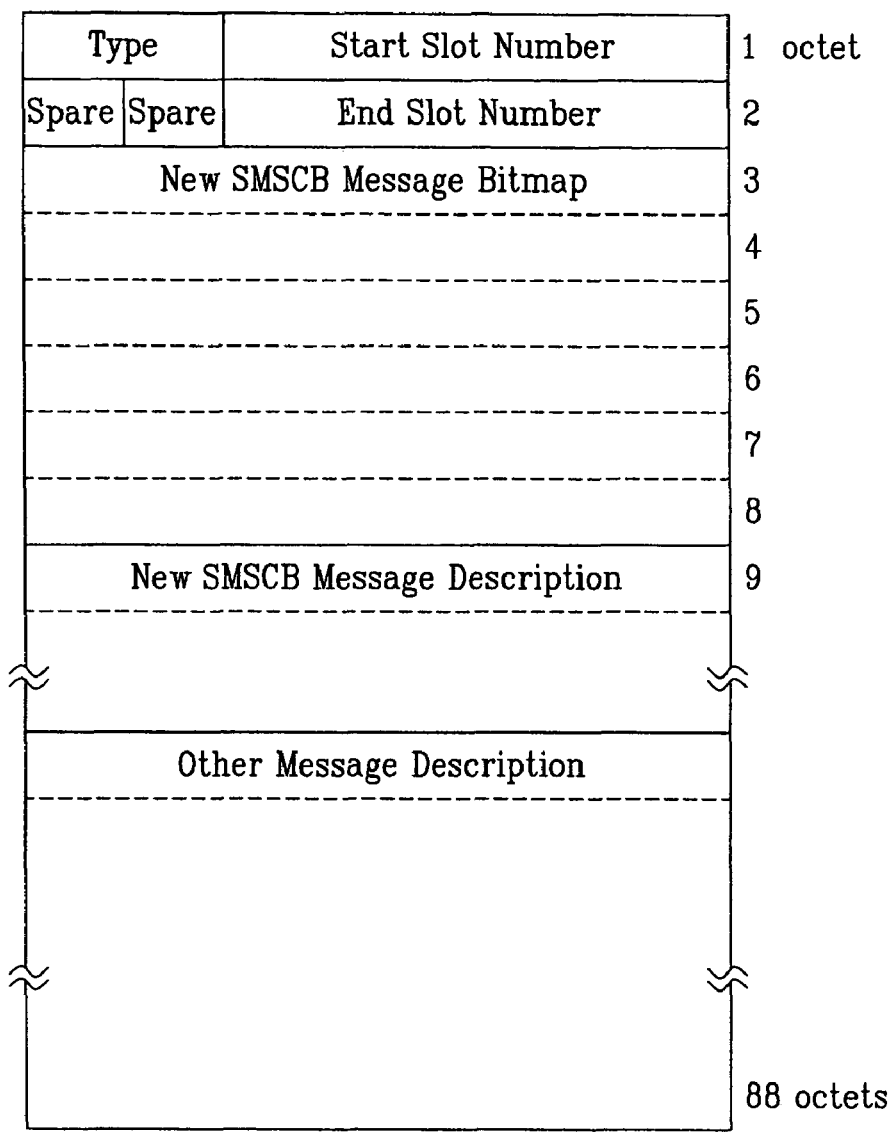
FIG. 3 is a diagram of a schedule message according to GSM standards.
Figure 4:
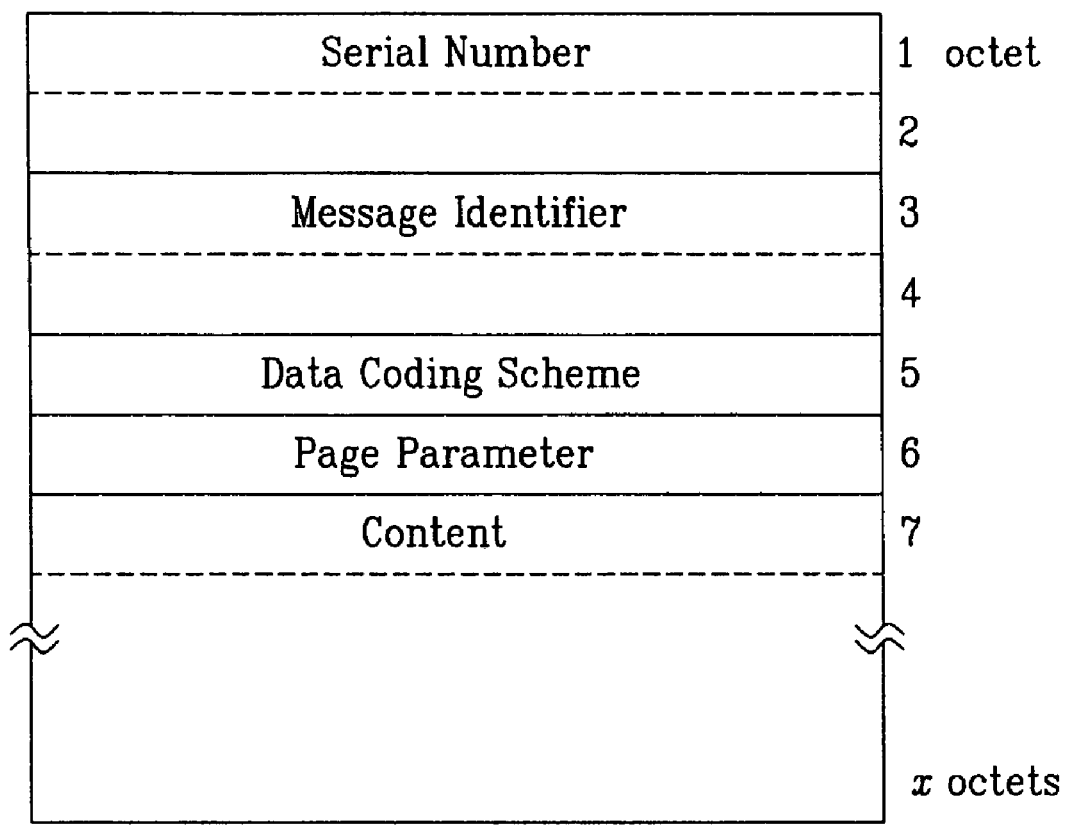
FIG. 4 is a diagram of an SMS message according to the present invention.
Figure 5:
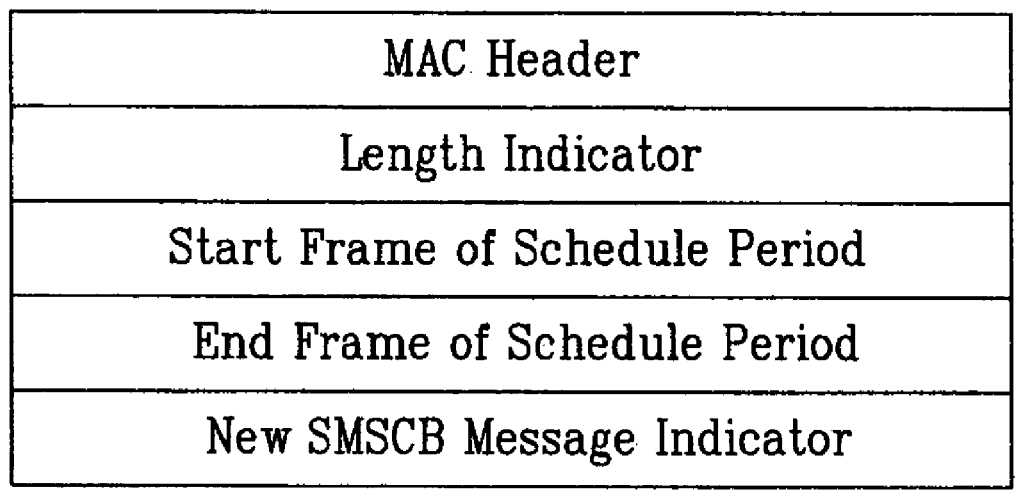
FIG. 5 is a diagram of a schedule message according to the present invention.

The present invention, which is an improvement of the SMS technology for the data link layer and the network layer, uses SMSCB messages and schedule messages as shown in FIGS. 4 and 5, respectively. The schemes of the messages according to the present invention differ from those shown in FIGS. 2 and 3.

As shown in FIG. 4, the SMSCB message is comprised of any number x octets, each field of the message being comprised of one or more octets, to include the message content preceded by a serial number field, a message identifier field, a data coding scheme field, and a page parameter field designating a total number of pages. The message identifier field indicates the message type and source, identifying the message as, for example, weather data, stock prices, or a traffic report. As shown in FIG. 5, in addition to known fields of a typical schedule message according to 3GPP standards, the schedule message according to the present invention includes a MAC header, a field indicating SMSCB message length, a field indicating the start and end frames of the schedule period for the SMSCB message, and a field indicating the presence of a new SMSCB message.

Figure 6:
FIG. 6 is a diagram of a MAC header of a schedule message according to the present invention.

The MAC header is shown in FIG. 6 and includes a C/D field and a C/T field. The C/D field indicates whether a data unit is to be mapped to a common logical channel or a dedicated logical channel, and the C/T field indicates whether the data unit is to be mapped to a common control channel or a common traffic channel. If the C/T field indicates that the data unit is to be mapped to the common traffic channel, the field also indicates whether the data unit belongs to the SMSCB message or to the schedule message.

The length indicator of the schedule message of FIG. 5 indicates the length of the SMSCB message and can be used to extend the length of an SMSCB message to any number of successive frames. The next two fields respectively indicate the start and end points of successive frame periods of the SMSCB message. After the completion of one SMSCB message—however long—a new SMSCB message would be indicated by the new SMSCB message indicator field, which also indicates the start frame of the renewed message.

As above, the SMSCB message according to the present invention is repeatable and renewable and can be read selectively. Moreover, the number of pages of the message contents and overall message length are not limited to the 88 octets of the message schemes of FIGS. 2 and 3. Therefore, the total number of pages and the number of pages of content are unlimited. Furthermore, the SMSCB message of the present invention, once transmitted from an application layer (a higher layer) though the RLC layer of the second radio layer (Layer 2), is segmented into a plurality of data units of four frames each, according to any message length. The MAC layer, which is a lower layer than the RLC layer, performs scheduling of the SMSCB message and attaches to the schedule message a header indicative of the length of the schedule message. This scheduling is in contrast to the GSM system where the RLC layer performs the scheduling and header attachment functions as well as SMSCB message segmentation. The MAC layer of the present invention generates and decodes the schedule message, such that the schedule message is a MAC message written as a protocol data unit corresponding to the MAC control protocol.

Rather than setting a fixed period, a schedule message according to the method of the present invention determines the schedule of the SMSCB message. That is, a current schedule message contains location information for a next schedule message, thus notifying the UE of its location.

The method for performing short message service according to the present invention will now be described.

As in the case of the GSM system, the SMSCB message in a 3GPP system is also received by a UE in either the DRX mode or the non-DRX mode, according to the type of short message being transmitted from the higher layer.

In the non-DRX mode, the UE reads all frames, i.e., all data units transmitted on the radio link, to read all SMSCB messages, and thereby any desired SMSCB message, without the information of a schedule message. In reading the frames, the UE reads the SMSCB message header so that the user can select a desired message.

In the DRX mode, to read a desired SMSCB message from the UTRAN, the UE must know exactly when each SMSCB message is transmitted from a given cell of the network. Therefore, the schedule message is used. The UE knows whether the SMSCB message has been renewed by reading the schedule message of FIG. 5 and thereby reading the new SMSCB message indicator field contained therein. Also, the start frame and end frame fields indicate the schedule period for the SMSCB message and thereby indicate successive frames where the renewed messaged is located. Accordingly, when the desired SMSCB message of the UE is renewed for the schedule period, the UE can read messages of the corresponding frame using the schedule message.

Figure 7:
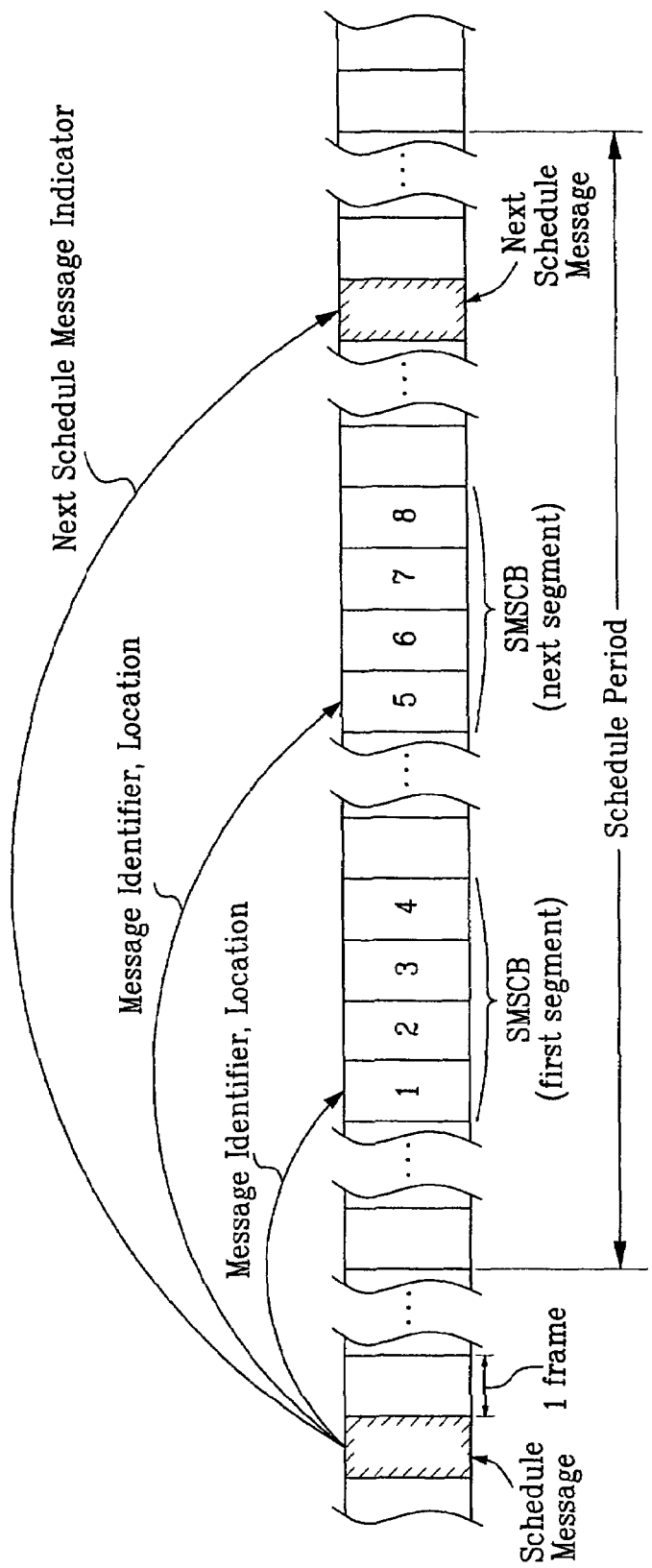
FIG. 7 is a diagram illustrating SMSCB transmission according to the is present invention.

Referring to FIG. 7, illustrating SMSCB transmission according to the present invention, a schedule message contains a message identifier and location information for the segmented SMSCB message and location information for the next schedule message. The UE reads the schedule message and is thereby enabled to read a desired SMSCB message.

Figure 8:
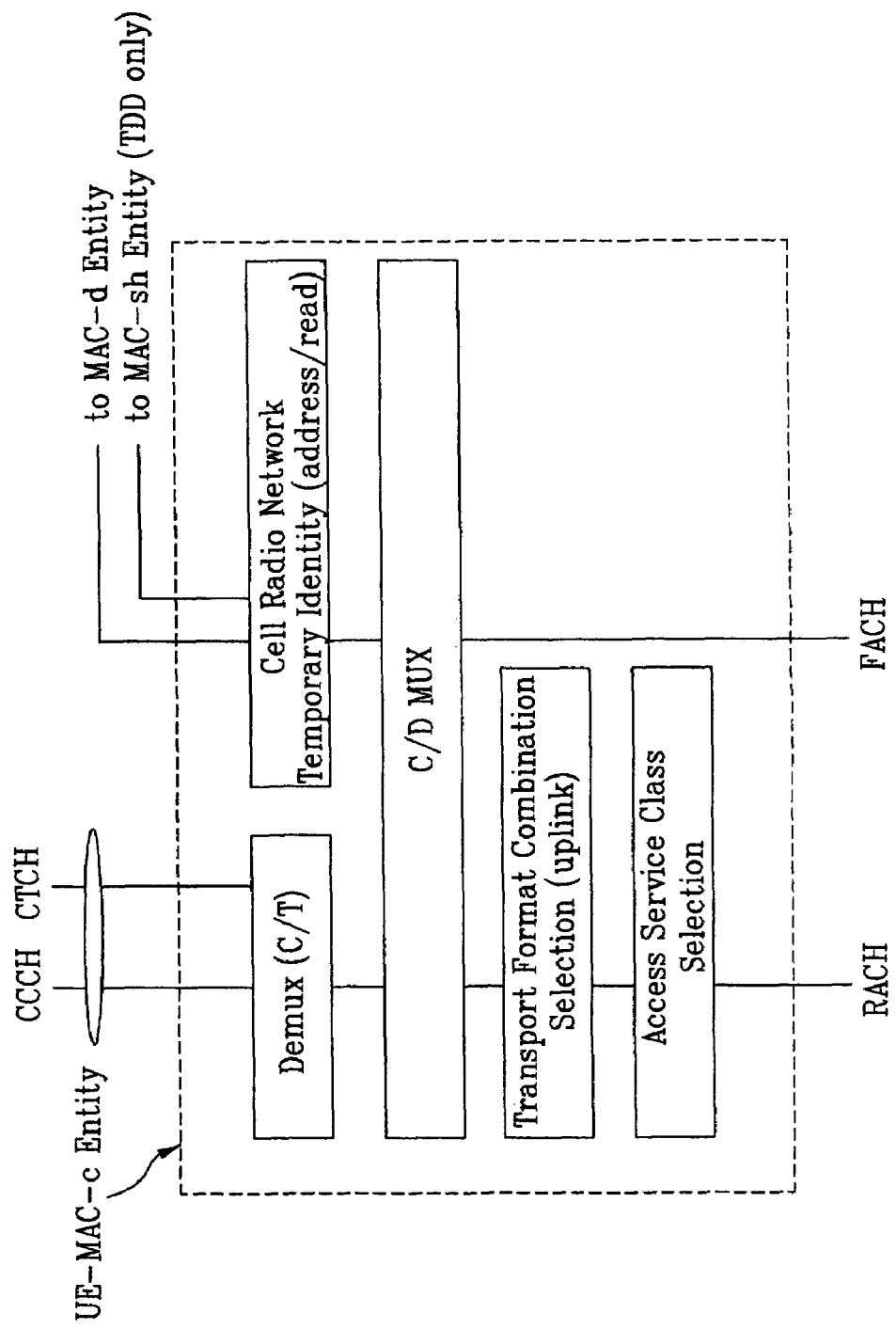
FIG. 8 is a diagram of a UE-MAC layer according to the present invention.
Figure 9:
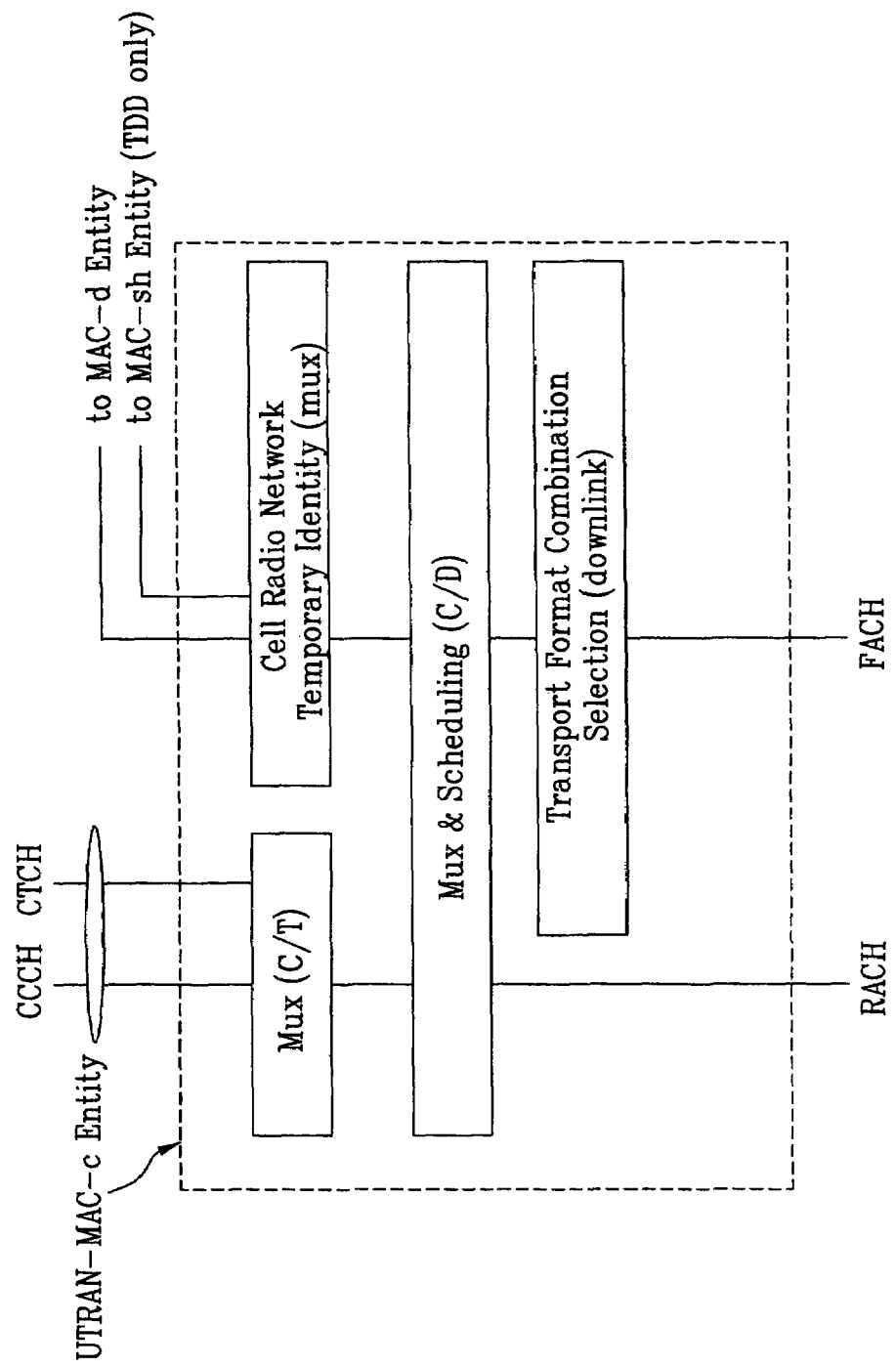
FIG. 9 is a diagram of a UTRAN-MAC layer according to the present invention.

FIGS. 8 and 9 illustrate a UE-MAC layer and a UTRAN-MAC layer according to the present invention, respectively. Here, the SMSCB message transmitted from the higher layer is transmitted to a common traffic channel among common logical channels.

The MAC layer multiplexes the common traffic channel with a common control channel (i.e., a common logical channel), a dedicated traffic channel (i.e., a dedicated logical channel), and a dedicated control channel. Then, scheduling for the SMS cell broadcasting is performed.

The MAC layer provides data transmission services through the logical channels to the RLC layer, which is a higher layer. The logical channels as provided are determined according to the type of information transmitted from the higher layer and may be either a control channel or a traffic channel. In other words, the logical channel type varies according to the data transmission service provided from the higher layer, such that a control channel is provided when control plane information is transmitted and a traffic channel is provided when user plane information is transmitted.

The control channel includes a dedicated control channel and a common control channel, which are bidirectional channels for transmitting information between the UE and the UTRAN. The dedicated control channel transmits dedicated control information and is established by the RRC layer, which is higher than the MAC layer. The common control channel transmits common control information and is commonly used by a plurality of UEs when the UTRAN does not access the RRC layer.

The traffic channel includes a dedicated traffic channel and a common traffic channel. The dedicated traffic channel is a channel assigned to the UE and exists as both a downlink and an uplink, to transmit user information. The common traffic channel is a unidirectional channel for transmitting user information to specific user groups or to all UEs.

If scheduling for the SMS cell broadcasting is performed after multiplexing the logical channels, the UTRAN-MAC layer can identify a frame where the data transmitted to each logical channel is transmitted. The MAC layer generates the schedule message for transmission of the SMSCB message, so that the UE can identify a frame where the renewed SMSCB message in the DRX mode is located. The UTRAN-MAC layer performs channel multiplexing and scheduling while the UE-MAC layer performs channel demultiplexing.

A forward access channel is assigned to the physical layer, which is a lower layer, for transmission of the SMSCB message. The forward access channel is a common downlink channel used to transmit relatively small amounts of data.

The type of data, and the mode of its transmission, are determining factors in the physical layer. The schedule message, which is transmitted from the UTRAN-MAC layer to the UE-MAC layer, enables the UE to assemble information to construct the SMSCB message.

In the method for performing cell broadcasting and a communication system using the same according to the present invention, the scheduling function is performed in the UTRAN-MAC layer, which then transmits a schedule message to the UE-MAC layer through a radio link. Accordingly, short messages of any length are enabled, and SMS cell broadcasting in a 3GPP system is achieved.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

What is claimed is:

1. A method for performing cell broadcasting, comprising
receiving in a mobile station at least one data unit of a short message service cell broadcasting (SMSCB) message broadcast from at least one cell of a communication system; and
reading the SMSCB message based on a schedule message comprised of a plurality of fields for informing the mobile station of a location of the SMSCB message, a length of a schedule period, and whether a new SMSCB message has been broadcast, and wherein the plurality of fields includes a field for informing the mobile station of a location of a next schedule message.

2. The method as claimed in claim 1, wherein the schedule message further comprises fields for informing the mobile station of at least one of a start frame of the schedule period and an end frame of the schedule period.

3. The method as claimed in claim 1, further comprising mapping the data units to one of a common logical channel of a lower layer in the communication system and a dedicated logical channel of the lower layer in the communication system.

4. The method as claimed in claim 3, wherein the schedule message further comprises a header determining the channel to which the data units are to be mapped.

5. The method as claimed in claim 1, further comprising mapping the data units to one of a common control channel of a lower layer in the communication system and a common traffic channel of the lower layer in the communication system.

6. The method as claimed in claim 5, wherein the schedule message further comprises a header determining the channel to which the data units are to be mapped.

7. The method as claimed in claim 1, wherein the schedule message is written as a protocol data unit.

8. The method as claimed in claim 1, wherein the at least one data unit of the SMSCB message is transmitted through a common traffic channel, the common traffic channel being multiplexed at a lower layer in the communication system with a common control channel, a dedicated traffic channel, and a dedicated control channel and wherein the common traffic channel and the common control channel are common logical channels and the dedicated traffic channel and the dedicated control channel are dedicated logical channels.

9. The method as claimed in claim 1, wherein the schedule message is transmitted from a higher layer in the communication system and the schedule message is received at a lower layer in the communication system.

10. The method as claimed in claim 9, wherein the lower layer performs scheduling of the SMSCB message and attaches to the schedule message a header indicative of schedule message length.

11. The method as claimed in claim 9, wherein the higher layer is a radio link control layer.

12. The method as claimed in claim 9, wherein the lower layer is a media access control (MAC) layer.

13. The method as claimed in claim 12, wherein the schedule message further comprises a MAC header.

14. The method as claimed in claim 13, wherein the MAC header comprises:
a first field indicating whether the at least one data unit is to be mapped to one of a common logical channel of the MAC layer or a dedicated logical channel of the MAC layer; and
a second field indicating whether the at least one data unit is to be mapped to one of a common control channel of the MAC layer or a common traffic channel of the MAC layer.

15. The method as claimed in claim 14, wherein if the second field indicates that the data units are to be mapped to the common traffic channel, the second field also indicates whether the data units comprise the SMSCB message or the schedule message.

16. The method as claimed in claim 1, wherein the fields of the schedule message are at least a length indicator field, a schedule period start frame field, a schedule period end frame field, and a new SMSCB message indicator field.

17. The method as claimed in claim 16, wherein the schedule message further comprises a header, the header indicating whether the data units are to be mapped to a common logical channel or a dedicated logical channel and whether the data units are to be mapped to a common control channel or a common traffic channel.

18. The method as claimed in claim 16, wherein the length indicator field determines a number of octets x of the SMSCB message, where x is equal to any whole number.

19. The method as claimed in claim 18, wherein the schedule period start frame field and the schedule period end frame field define a schedule period for a renewed SMSCB message.

20. The method as claimed in claim 19, wherein the new SMSCB message indicator field indicates a start frame of the renewed SMSCB message.

21. A method for performing cell broadcasting, comprising
scheduling a short message service cell broadcasting (SMSCB) message;
multiplexing, at a media access control (MAC) layer in a first communication system, a common traffic channel with a common control channel, a dedicated traffic channel, and a dedicated control channel, wherein the common traffic channel and the common control channel are common logical channels and the dedicated traffic channel and the dedicated control channel are dedicated logical channels;
generating, at the MAC layer, a schedule message for transmission of the SMSCB message; and
transmitting the schedule message through the common traffic channel of the first communication system.

22. The method as claimed in claim 21, further comprising segmenting the SMSCB message into a plurality of data units to be scheduled.

23. The method as claimed in claim 21, wherein the schedule message is received at a second communication system for reading the SMSCB message and wherein the first communication system is one of a mobile station and a network, and the second communication system is the other one of the mobile station and the network.

24. The method as claimed in claim 23, wherein the schedule message is comprised of a plurality of fields for informing the mobile station of a location of the SMSCB message, a length of a schedule period, and whether the network has broadcast a new SMSCB message.

25. The method as claimed in claim 24, wherein the schedule message further comprises a field for informing the mobile station of a location of a next schedule message.

26. The method as claimed in claim 24, wherein the schedule message further comprises fields for informing the mobile station of at least one of a start frame of the schedule period and an end frame of the schedule period.

27. The method as claimed in claim 21, wherein the schedule message further comprises a MAC header.

28. The method as claimed in claim 27, wherein the MAC header comprises:
- a first field indicating whether a plurality of data units are to be mapped to one of the common logical channel of the MAC layer or the dedicated logical channel of the MAC layer; and
- a second field indicating whether the plurality of data units are to be mapped to one of the common control channel of the MAC layer or the common traffic channel of the MAC layer.

29. A method for cell broadcasting, comprising
receiving a schedule message through a common traffic channel of a first communication system;
demultiplexing, at a media access control (MAC) layer in the first communication system, a common traffic channel with a common control channel, a dedicated traffic channel, and a dedicated control channel, wherein the common traffic channel and the common control channel are common logical channels and the dedicated traffic channel and the dedicated control channel are dedicated logical channels; and
reading a short message service cell broadcasting (SMSCB) message based on the schedule message, wherein the schedule message includes a plurality of fields for informing the mobile station of: a location of the SMSCB message, a length of a schedule period, whether the network has broadcast a new SMSCB message, and a location of a next schedule message.

30. The method as claimed in claim 29, further comprising reconstructing the SMSCB message from a plurality of scheduled data units.

31. The method as claimed in claim 29, wherein the schedule message is transmitted from a second communication system for scheduling the SMSCB message and wherein the first communication system is one of a mobile station and a network, and the second communication system is the other one of the mobile station and the network.

32. The method as claimed in claim 29, wherein the schedule message further includes fields for informing the mobile station of at least one of a start frame of the schedule period and an end frame of the schedule period.

33. The method as claimed in claim 29, wherein the schedule message further includes a MAC header.

34. The method as claimed in claim 33, wherein the MAC header comprises:
- a first field indicating whether a plurality of scheduled data units are to be mapped to one of the common logical channel of the MAC layer or the dedicated logical channel of the MAC layer; and
- a second field indicating whether a plurality of scheduled data units are to be mapped to one of the common control channel of the MAC layer or the common traffic channel of the MAC layer.

35. A system for performing cell broadcasting, comprising:
a UTRAN-MAC-c entity for scheduling a short message service cell broadcasting (SMSCB) message by segmenting the SMSCB message into a plurality of data units,
multiplexing, at a UTRAN media access control (MAC) layer in a first communication system, a common traffic channel with a common control channel, a dedicated traffic channel, and dedicated control channel, wherein the common traffic channel and the common control channel are common logical channels and the dedicated traffic channel and the dedicated control channel are dedicated logical channels,
generating, at the UTRAN MAC layer, a schedule message for transmission of the SMSCB message, and
transmitting the schedule message through the common traffic channel of the first communication system; and
a UE-MAC-c entity for receiving a schedule message through a common traffic channel of a first communication system,
demultiplexing, at a UE lower layer in the first communication system, a common traffic channel with a common control channel, a dedicated traffic channel, and a dedicated control channel, wherein the common traffic channel and the common control channel are common logical channels and the dedicated traffic channel and the dedicated control channel are dedicated logical channels, and
reading the SMSCB message based on the schedule message, by reconstructing the SMSCB message from the plurality of data units,
wherein the schedule message is comprised of a plurality of fields for informing a mobile station of a location of the SMSCB message, a length of a schedule period, whether a new SMSCB message has been broadcast and a location of a next schedule message.

36. The method as claimed in claim 35, wherein the schedule message further comprises fields for informing the mobile station of at least one of a start frame of the schedule period and an end frame of the schedule period.

37. The method as claimed in claim 35, wherein the lower layer comprises a media access control layer.

* * * * *